US 8,078,971 B2

(12) United States Patent
Ghattu

(10) Patent No.: US 8,078,971 B2
(45) Date of Patent: Dec. 13, 2011

(54) SYSTEM AND METHOD FOR SCRIPTING EXPLORER FOR SERVER CONFIGURATION

(75) Inventor: Satya Srinivas Ghattu, Tewksbury, MA (US)

(73) Assignee: Oracle International Corporation, Redwood Shores, CA (US)

(\*) Notice: Subject to any disclaimer, the term of this patent is extended or adjusted under 35 U.S.C. 154(b) by 551 days.

(21) Appl. No.: 11/339,103

(22) Filed: Jan. 24, 2006

(65) Prior Publication Data

US 2007/0174776 A1 Jul. 26, 2007

(51) Int. Cl.
*G06F 15/177* (2006.01)
(52) U.S. Cl. ........ 715/736; 715/734; 715/735; 715/738; 715/739; 715/853; 715/854; 709/220; 709/221; 709/222; 709/223; 709/224; 717/115
(58) Field of Classification Search .......... 715/734–739, 715/853, 854; 709/220–226; 717/115
See application file for complete search history.

(56) References Cited

U.S. PATENT DOCUMENTS

| | | | | |
|---|---|---|---|---|
| 6,005,568 A * | 12/1999 | Simonoff et al. | ............. | 715/744 |
| 6,035,119 A * | 3/2000 | Massena et al. | ............. | 717/100 |
| 6,043,815 A * | 3/2000 | Simonoff et al. | ............. | 715/744 |
| 6,078,322 A * | 6/2000 | Simonoff et al. | ............. | 715/744 |
| 6,104,872 A * | 8/2000 | Kubota et al. | ................. | 717/110 |
| 6,167,534 A * | 12/2000 | Straathof et al. | ................. | 714/38 |
| 6,189,024 B1 * | 2/2001 | Bauersfeld et al. | ........... | 709/203 |
| 6,268,852 B1 * | 7/2001 | Lindhorst et al. | ............. | 715/744 |
| 6,380,924 B1 * | 4/2002 | Yee et al. | ....................... | 345/156 |
| 6,449,739 B1 * | 9/2002 | Landan | ........................... | 714/47 |
| 6,466,240 B1 * | 10/2002 | Maslov | ........................ | 715/234 |
| 6,484,261 B1 * | 11/2002 | Wiegel | .............................. | 726/11 |
| 6,625,803 B1 * | 9/2003 | Massena et al. | ............. | 717/100 |
| 6,701,514 B1 * | 3/2004 | Haswell et al. | ................. | 717/115 |
| 6,765,591 B2 * | 7/2004 | Poisson et al. | ................. | 715/735 |
| 6,775,821 B2 * | 8/2004 | Scouten | ........................ | 717/115 |
| 6,792,460 B2 * | 9/2004 | Oulu et al. | ..................... | 709/224 |
| 6,842,755 B2 * | 1/2005 | Maslov | ........................ | 717/115 |
| 7,007,266 B1 * | 2/2006 | Isaacson | ........................ | 717/100 |
| 7,020,697 B1 * | 3/2006 | Goodman et al. | ............ | 709/223 |
| 7,162,698 B2 * | 1/2007 | Huntington et al. | .......... | 715/736 |
| 7,171,650 B2 * | 1/2007 | Fenton et al. | .................. | 717/120 |
| 7,197,559 B2 * | 3/2007 | Goldstein et al. | ............. | 709/224 |
| 7,206,827 B2 * | 4/2007 | Viswanath et al. | ........... | 709/220 |
| 7,236,987 B1 | 6/2007 | Faulkner et al. | | |
| 7,324,983 B1 * | 1/2008 | Morris et al. | .................... | 706/48 |
| 7,337,408 B2 * | 2/2008 | DeLuca et al. | ................. | 715/763 |
| 7,343,586 B1 * | 3/2008 | Hernandez, III | ............. | 717/124 |
| 7,350,152 B2 * | 3/2008 | DeLuca et al. | ................. | 715/763 |
| 7,401,259 B2 * | 7/2008 | Bhowmik et al. | ............... | 714/31 |
| 7,546,581 B2 * | 6/2009 | Wainwright | ................... | 717/115 |

(Continued)

*Primary Examiner* — Weilun Lo
*Assistant Examiner* — Eric Wiener
(74) *Attorney, Agent, or Firm* — Fliesler Meyer LLP

(57) ABSTRACT

The present invention provides provide GUI-type server scripting explorer that allows a user to browse, invoke, and update via its GUI all kinds of management objects available on a server. The explorer embeds a command interpreter through which the user can invoke server scripting commands directly from within the tool. All the actions that the user performed can be recorded to a file to build a server configuration script that can be used to repeat the same actions to config the server in the future. This description is not intended to be a complete description of, or limit the scope of, the invention. Other features, aspects, and objects of the invention can be obtained from a review of the specification, the figures, and the claims.

18 Claims, 13 Drawing Sheets

U.S. PATENT DOCUMENTS

| | | | |
|---|---|---|---|
| 7,555,743 B2* | 6/2009 | Sridhar et al. | 717/106 |
| 7,689,973 B2* | 3/2010 | Kwong et al. | 717/126 |
| 2002/0054090 A1* | 5/2002 | Silva et al. | 345/747 |
| 2002/0198985 A1* | 12/2002 | Fraenkel et al. | 709/224 |
| 2003/0023952 A1* | 1/2003 | Harmon, Jr. | 717/106 |
| 2003/0074606 A1* | 4/2003 | Boker | 714/42 |
| 2004/0085347 A1* | 5/2004 | Hagarty et al. | 345/735 |
| 2004/0098472 A1* | 5/2004 | Styles et al. | 709/221 |
| 2004/0194066 A1* | 9/2004 | Frey et al. | 717/127 |
| 2004/0233234 A1* | 11/2004 | Chaudhry et al. | 345/735 |
| 2005/0193269 A1* | 9/2005 | Haswell et al. | 714/38 |
| 2005/0255861 A1* | 11/2005 | Wilson et al. | 455/456.2 |
| 2005/0278692 A1* | 12/2005 | Sridhar et al. | 717/106 |
| 2006/0059253 A1* | 3/2006 | Goodman et al. | 709/223 |
| 2006/0070082 A1* | 3/2006 | Sridhar et al. | 719/318 |
| 2006/0122985 A1* | 6/2006 | Yamamoto et al. | 707/3 |
| 2006/0123390 A1* | 6/2006 | Chan et al. | 717/115 |
| 2006/0136490 A1* | 6/2006 | Aggarwal et al. | 707/103 R |
| 2006/0276997 A1* | 12/2006 | Drees | 702/182 |

* cited by examiner

SYSTEM AND METHOD FOR SCRIPTING EXPLORER FOR SERVER CONFIGURATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

This application hereby incorporates by reference in its entirety:

U.S. patent application Ser. No. 10/939,257, entitled SYSTEM AND METHOD FOR SCRIPTING TOOL FOR SERVER CONFIGURATION by Satya Ghattu, filed Sep. 10, 2004.

FIELD OF THE INVENTION

This invention relates to the field of scripting tools for server configuration.

BACKGROUND

A scripting tool of a server running application software modules allows a user (an administrator and/or operator) of the server to perform administrative tasks and initiate configuration and/or runtime information changes on the server. Here the server can be, but is not limited to, a web server, an application server, a database server, an administrative server, and other suitable server. The scripting tool can provide a scripting interface that a developer can use to interact with and/or configure the server. Here, such scripting interface can be, but is not limited to, a command-line scripting shell (window), a graphical user interface (GUI), an explorer (browser), and other suitable interface. Although command-line scripting interface has been available, a GUI type of explorer that allows a user to browse scripting files on the server in a similar fashion as Windows Explore and perform both simple and complex changes to their server configurations reliably and interactively is certainly desirable.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention provide GUI-type server scripting explorer that allows a user to browse, invoke and update via its GUI all kinds of management objects available on a server. The management object on the server can be an instance of a MBean (managed bean), or an object of a class defined by an object-oriented programming language such as C++. Here, the MBean is a Java bean that represents a manageable resource, which includes, but is not limited to, an application, a service, a component, and a device. Such an explorer offers the user an inside look at the server's domains and how the domain configurations are laid out. It allows the user to manage different server domains and each connection to a domain is a separate tab in the explorer. Here, a domain is a logically related group of servers located on one or more machines (computers). The user can create, delete and change the domain configuration via the management objects with ease. In addition, the explorer embeds the command interpreter in the GUI through which the user can invoke server scripting commands directly from within the tool. All the actions that the user performed (i.e., explorer configuration commands) can be recorded to a file to build a server configuration script that can be used to repeat the same actions to config the server in the future.

Figure 1:
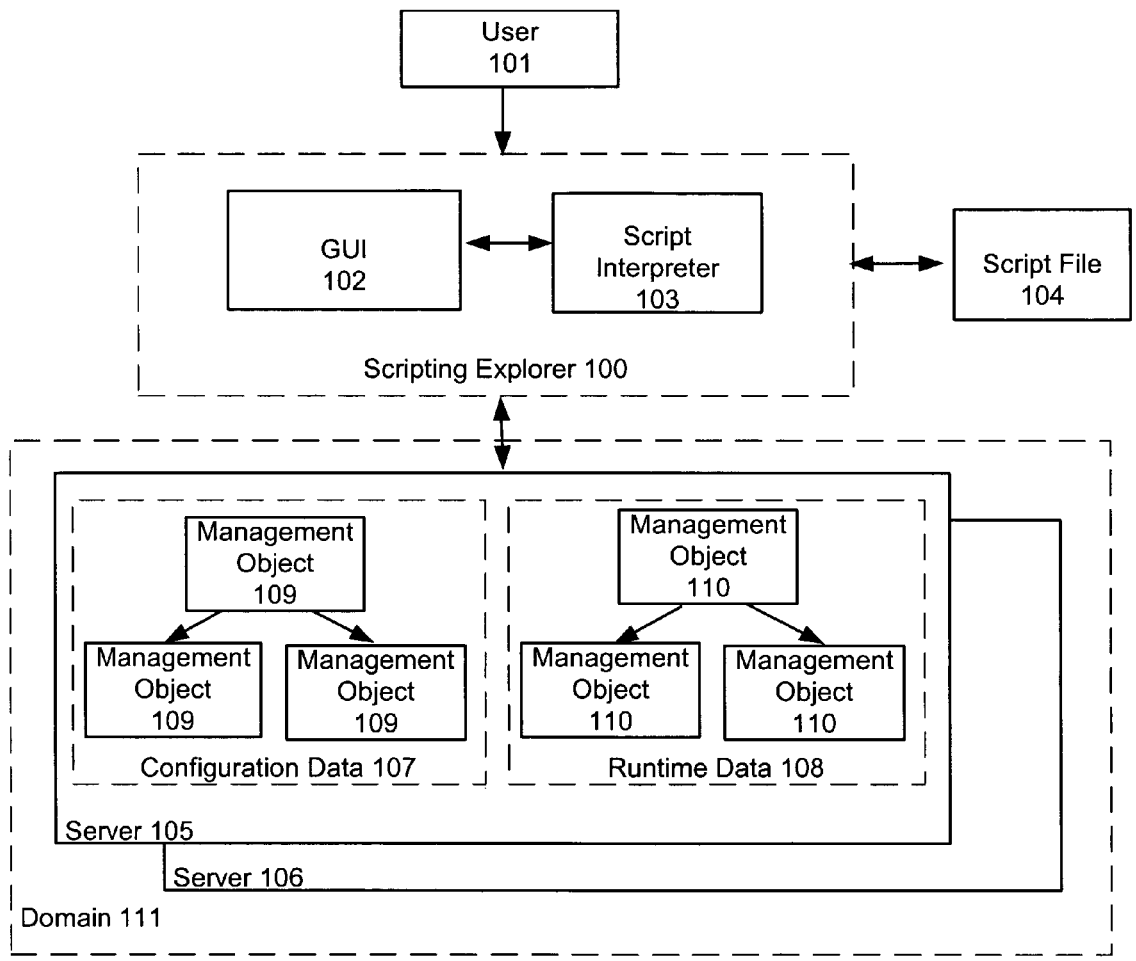
FIG. 1 is an illustration of an exemplary scripting explorer in accordance with one embodiment of the present invention.

FIG. 1 is an illustration of an exemplary scripting explorer 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1. a scripting graphic user interface (GUI) 102 of a scripting explorer 100 allows a user 101 to browse and/or invoke a plurality of management objects 109 and 110 available on one or more servers 105 and 106 in a domain 111. These management objects contain, among other data, configuration data 107 and runtime data 108, which can be organized in a traversable hierarchy such as a tree. Once the scripting explorer establishes a connection to server 105, the user can navigate, interrogate, and/or update data 107 and 108 in the management objects via the explorer. The actions performed the user can be recorded into a script file 104 to be repeated later. A command line script interpreter 103 can also be embedded in the GUI through which the user can invoke server scripting commands directly from within the explorer.

Figure 2:
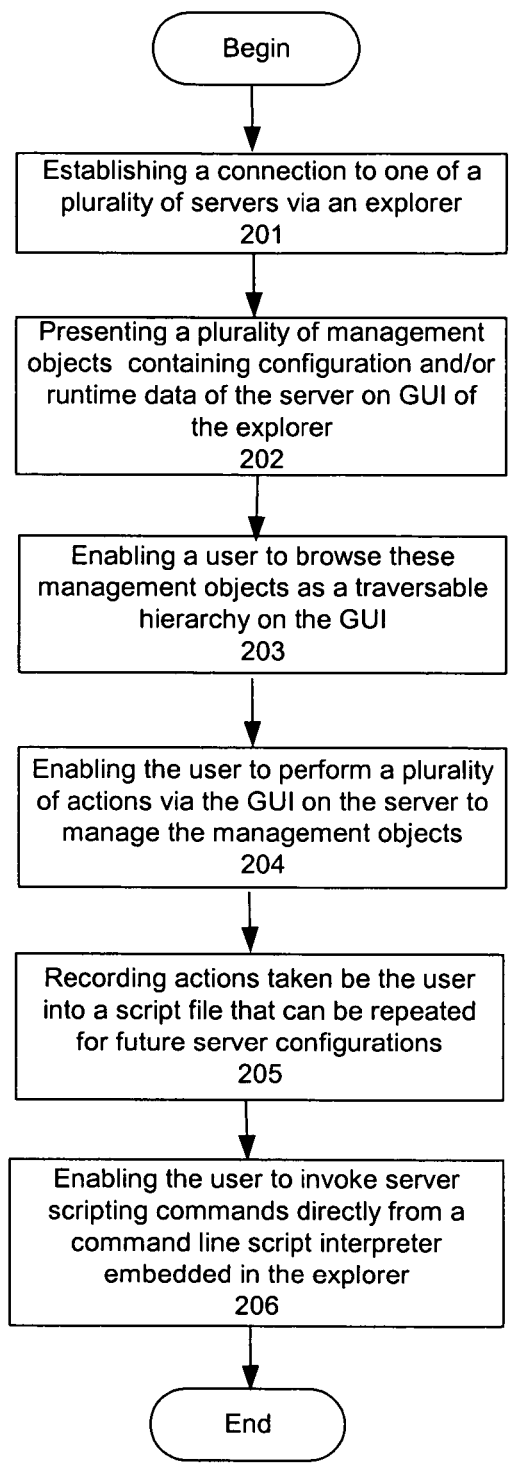
FIG. 2 is a flow chart illustrating an exemplary server exploring and scripting process in accordance with one embodiment of the invention.

FIG. 2 is a flow chart illustrating an exemplary server exploring and scripting process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the explorer first establishes a connection to one of a plurality of servers at step 201. Once the connection is established, the explorer presents a plurality of management objects containing configuration and/or runtime data of the server on a GUI of the explorer at step 202, and enable a user to browse these management objects as a traversable hierarchy on the GUI at step 203. The explorer further enables the user to perform a plurality of operations via the GUI on the server, including creating, deleting, and updating the management objects at step 204. The explorer can record actions taken be the user into a script file that can be repeated for future server configurations at step 205. Alternatively, the explorer also embeds a command line script interpreter operable to enable the user to invoke server scripting commands directly from the explorer at step 206.

In various embodiments, the scripting explorer enables a user to interact with servers and their domains in a session-like manner by establishing a persistent connection. Once the connection is established, it is persistently maintained throughout the user session, and multiple steps that are performed against the server can be captured, including instructions that make use of the common features including, but are not limited to, local variables, loops, conditionals and control flow. The states of all instructions executed may be saved and referenced during the session, and the connection may not quit until the user decides to disconnect from the server. Such "session-permanent-connection" approach eliminates the need for the user to establish and re-authenticate a connection for each instruction and a separate virtual machine such as a Java Virtual Machine (JVM), to run the scripting explorer.

In some embodiments, the configuration information of a server can be arranged in a hierarchical fashion to allow for easy navigation. The scripting interface of the scripting tool can allow the user to navigate all configuration information for a given domain on the server by invoking methods on the domain or its children. The scripting interface may let the user easily navigate through all the information in the domain, including both the configuration and runtime information.

In some embodiments, the configuration and/or runtime information of a server (that can be defined as global and/or local variables) is available through configuration management objects, which are software components on the server that can be arranged in a traversable hierarchy, which can be, but is not limited to, a tree. The scripting explorer can allow the user to navigate, interrogate, and/or update the configuration data of the server by invoking methods on the management objects once the scripting explorer is connected to a running server. After navigating to a management object, the user may interact with the object to navigate and/or interrogate all the management objects in a domain, including configuration, runtime, administration, and any custom management objects registered in the server.

In some embodiments, the runtime (when the server is up and running) information of the domain is also available in a hierarchical fashion similar to the configuration information. The navigation model for runtime is similar to that for the configuration except that it is domain-wide and un-editable. If the user chooses to navigate to a configuration management object from a runtime tree, he/she can do so by using the 'config' instruction that will place the user at the last configuration management object when he moved to the runtime tree.

Figure 3:
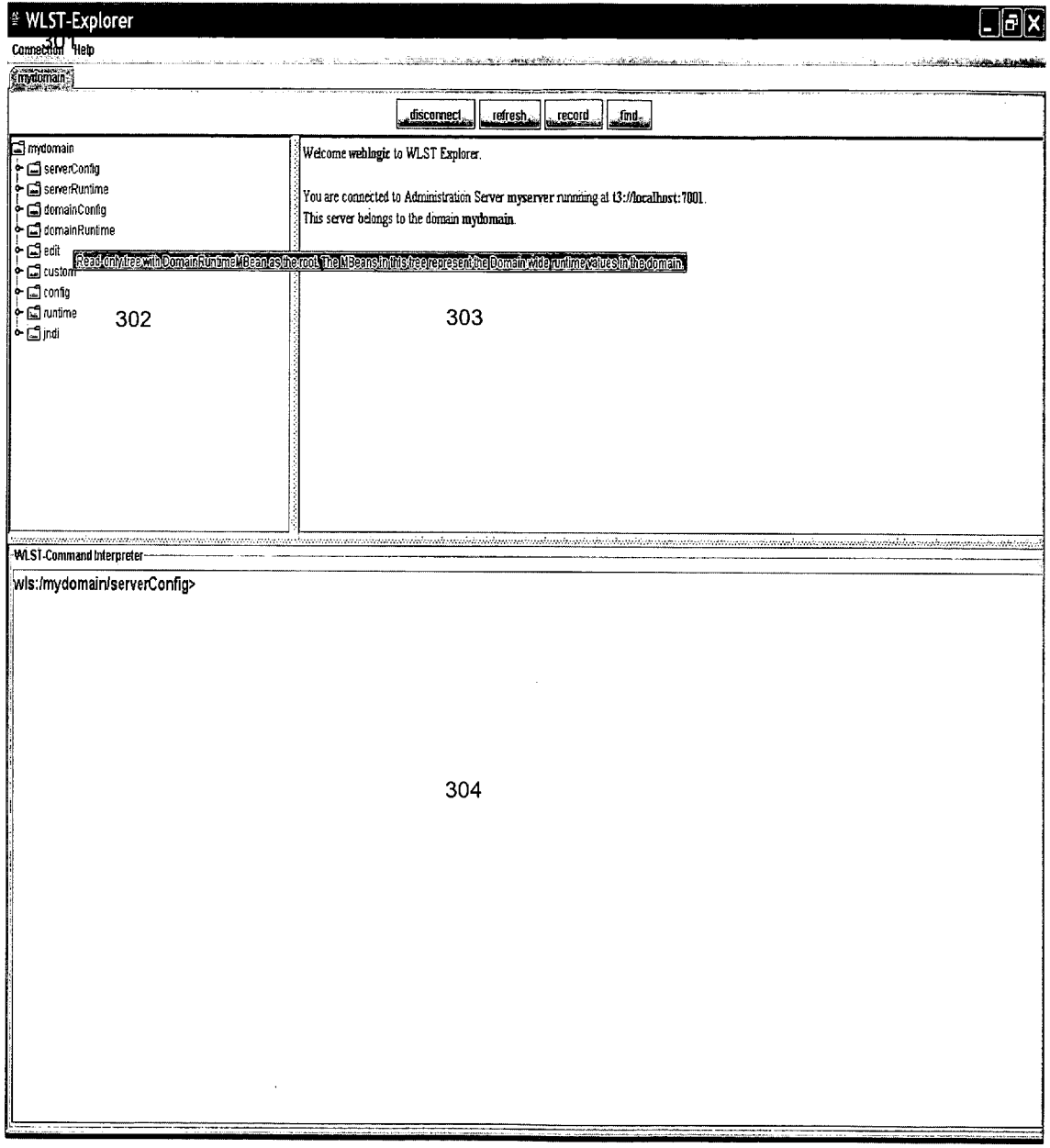
FIG. 3 is a exemplary GUI of the explorer with one embodiment of the invention.

Once the user logins and connects the explorer to a server in a domain 301, the explorer shows all the management objects (MBeans) available to browse in the left pane 302 of an exemplary GUI shown in FIG. 3. Organized as trees, these MBeans include configuration and runtime data as well as other information of both the server and its domain. The right pane 303 of the GUI can show attributes and operations available on the specific MBean the user is browsing. Initially, the user is at the root of the tree for MBeans of domain runtime after login, which represent domain-wide runtime values of the domain. The bottom pane of the GUI is the command-line script interpreter 304.

Figure 4:
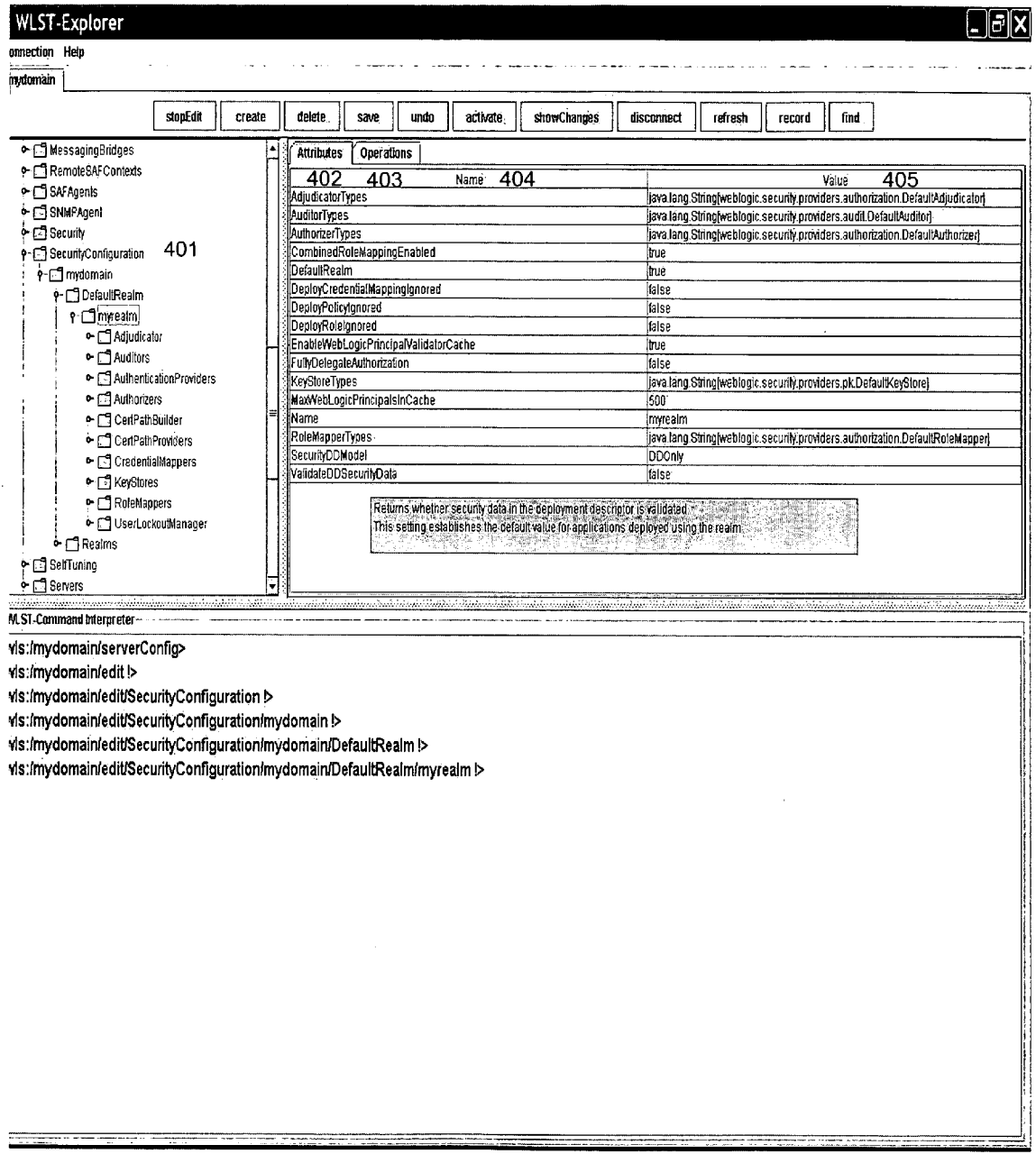
FIG. 4 is an exemplary an exemplary navigation path of the user through the management objects in the GUI in accordance with one embodiment of the invention.

FIG. 4 shows an exemplary navigation path of the user through the management objects in the GUI. The left pane of the GUI shows the top-down browsing path through the "edit" tree of MBeans all the way to the leaf node "myrealm" 401, which contain security configurations. The right pane of the GUI presents the names 404 and values 405 of the attributes 402 of myrealm, including the default values of the security data used for application deployment. These values can also be updated with various operations 403 on the management object.

Figure 5:
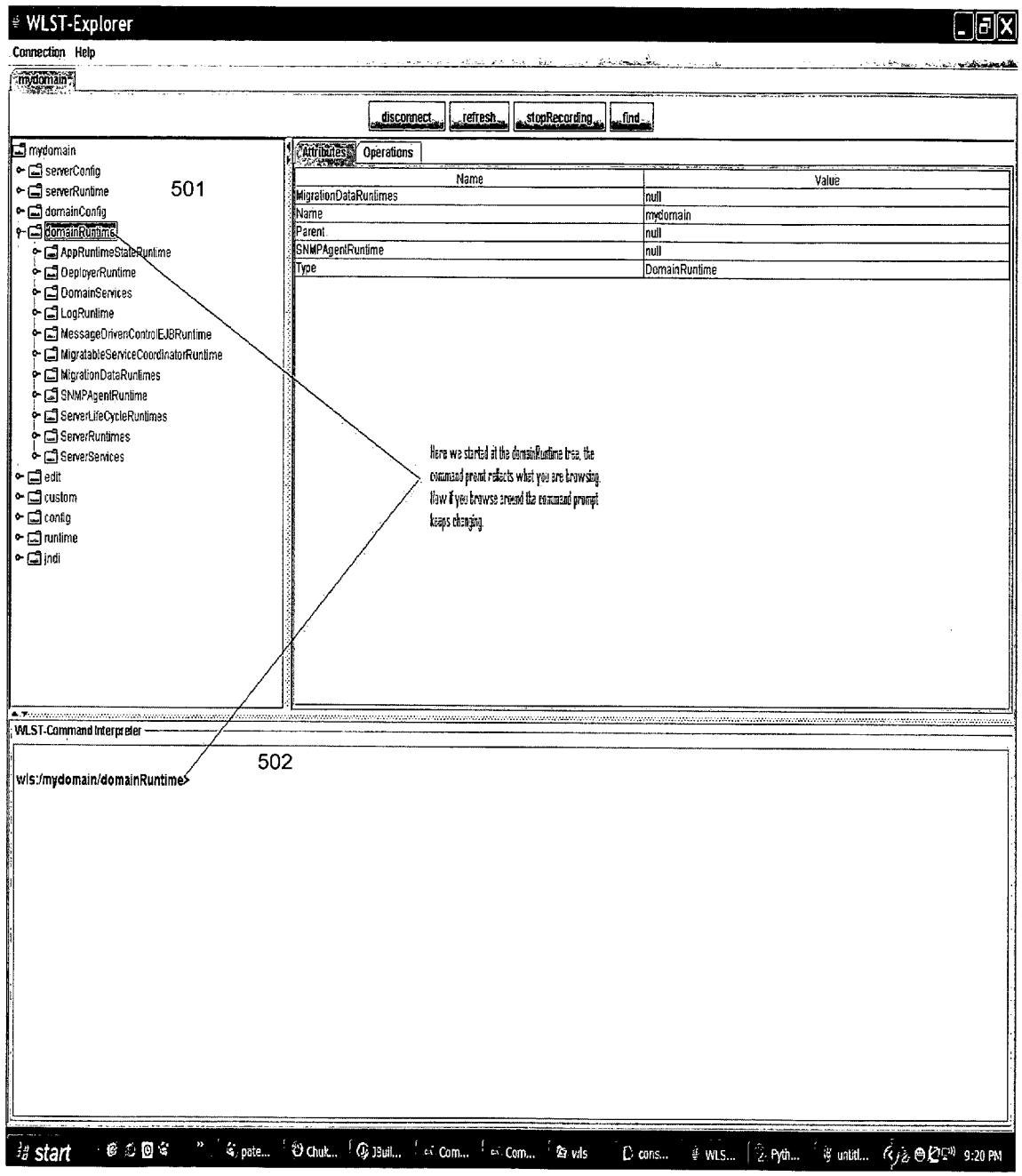
FIG. 5($a$)-($b$) is an exemplary illustration of synchronization between step by step browsing actions in the GUI and a command line script interpreter in accordance with one embodiment of the invention.
Figure 5:
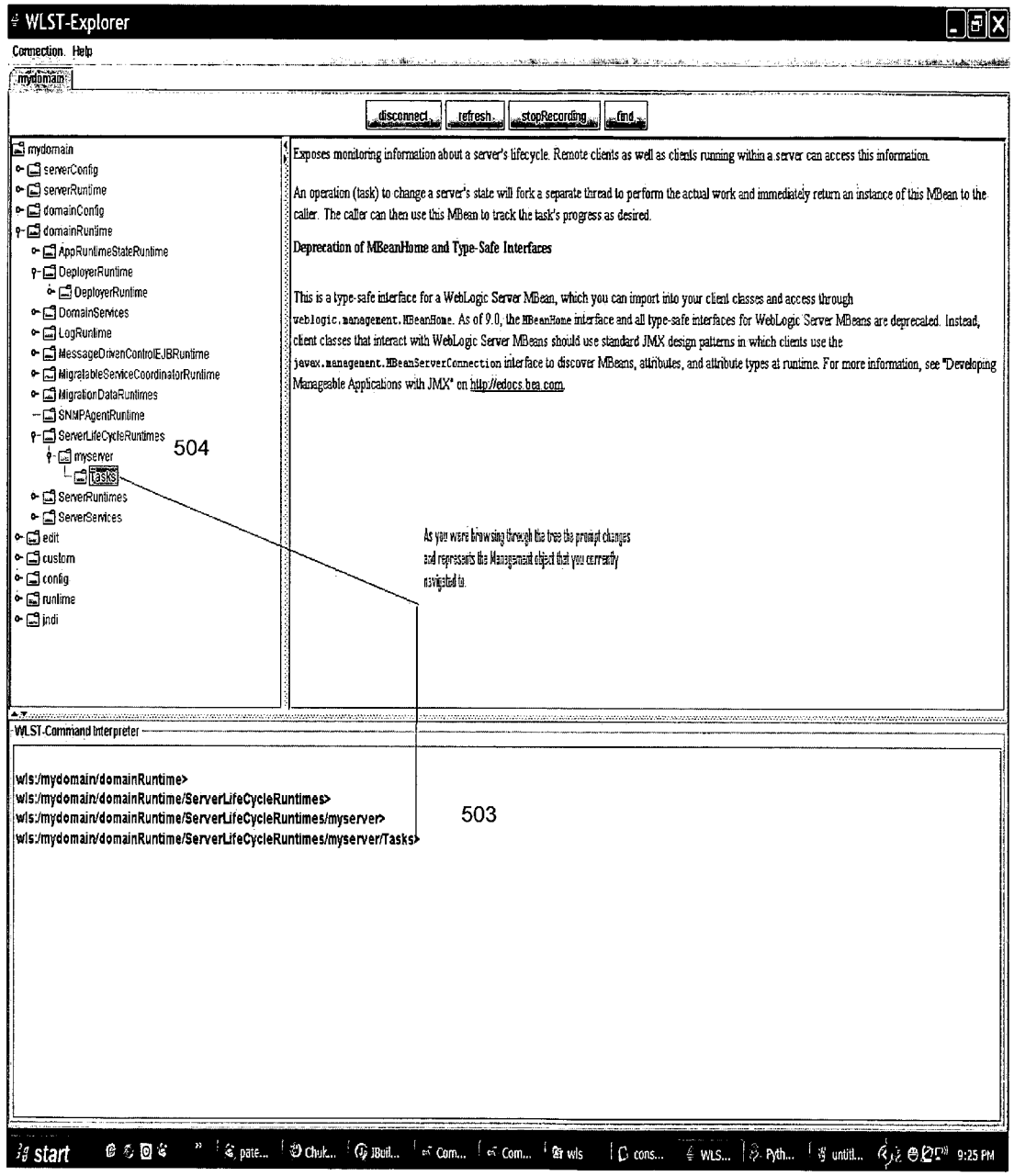

In some embodiments, the step by step browsing actions in the GUI can be synchronized with the command line script interpreter by the explorer as shown in FIG. 5(a)-(b). In other words, while the user is navigating and/or invoking the tree of MBeans, the display of location at the prompt of the command line interpreter also changes accordingly. For a non-limiting example, if the user starts at the root of the domain runtime tree 501, the command prompt 502 at the command line interpreter also reflects the place where the user is browsing (FIG. 5(a)). As the user browses through the tree of MBeans, the command prompt also changes lockstep to display the path 503 and the management object 504 the user is currently navigating to (FIG. 5(b)).

Figure 6:
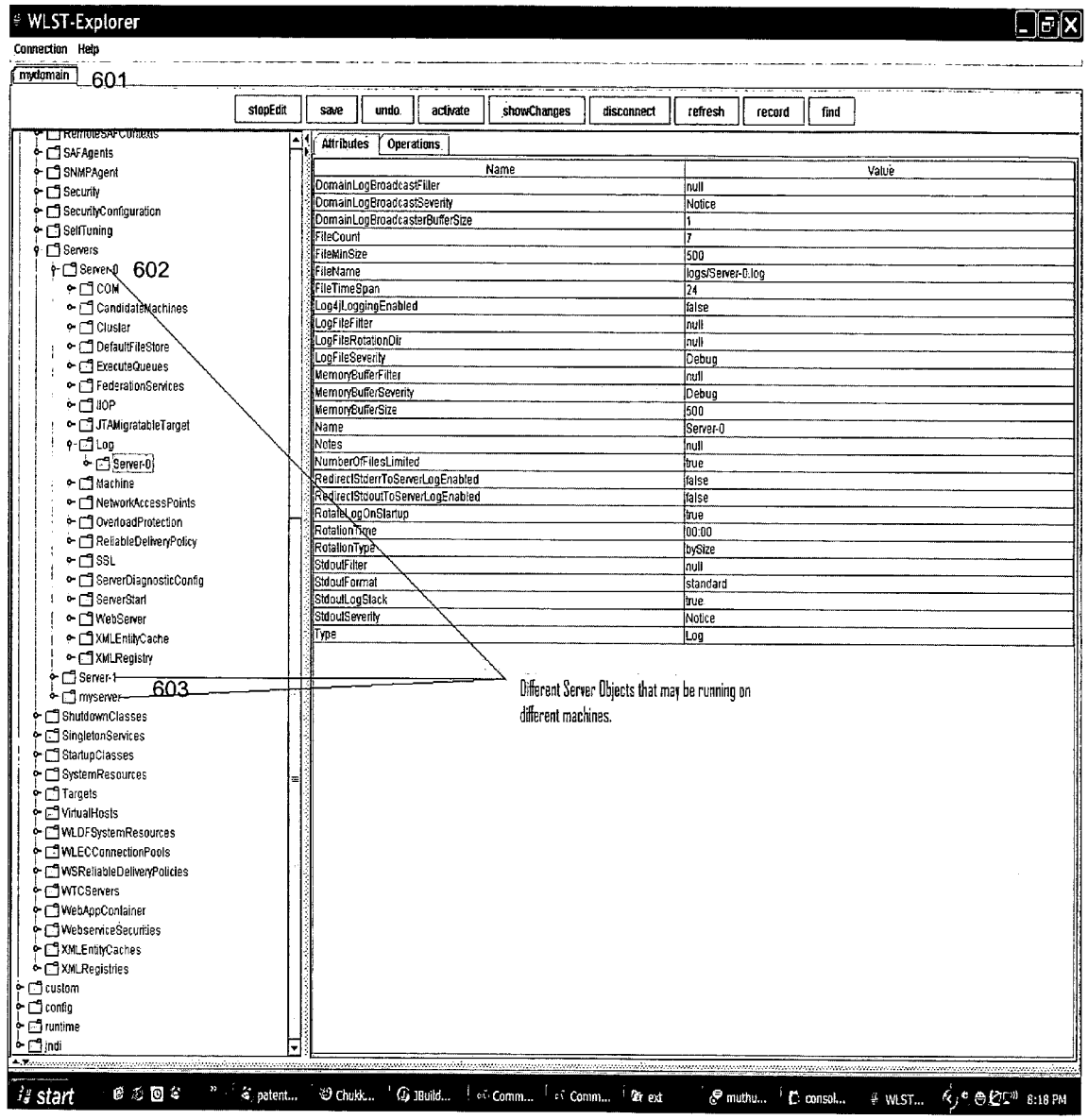
FIG. 6 is an exemplary illustration of navigating and managing management objects of multiple servers in accordance with one embodiment of the invention.

In some embodiments, the explorer allows a user to navigate to management objects that are associated with different servers 602 and 603 in a domain 601, wherein each server has its own set of management objects organized in a traversable hierarchy as shown in FIG. 6. These servers can be running on either the same machine or entirely different machines.

Figure 7:
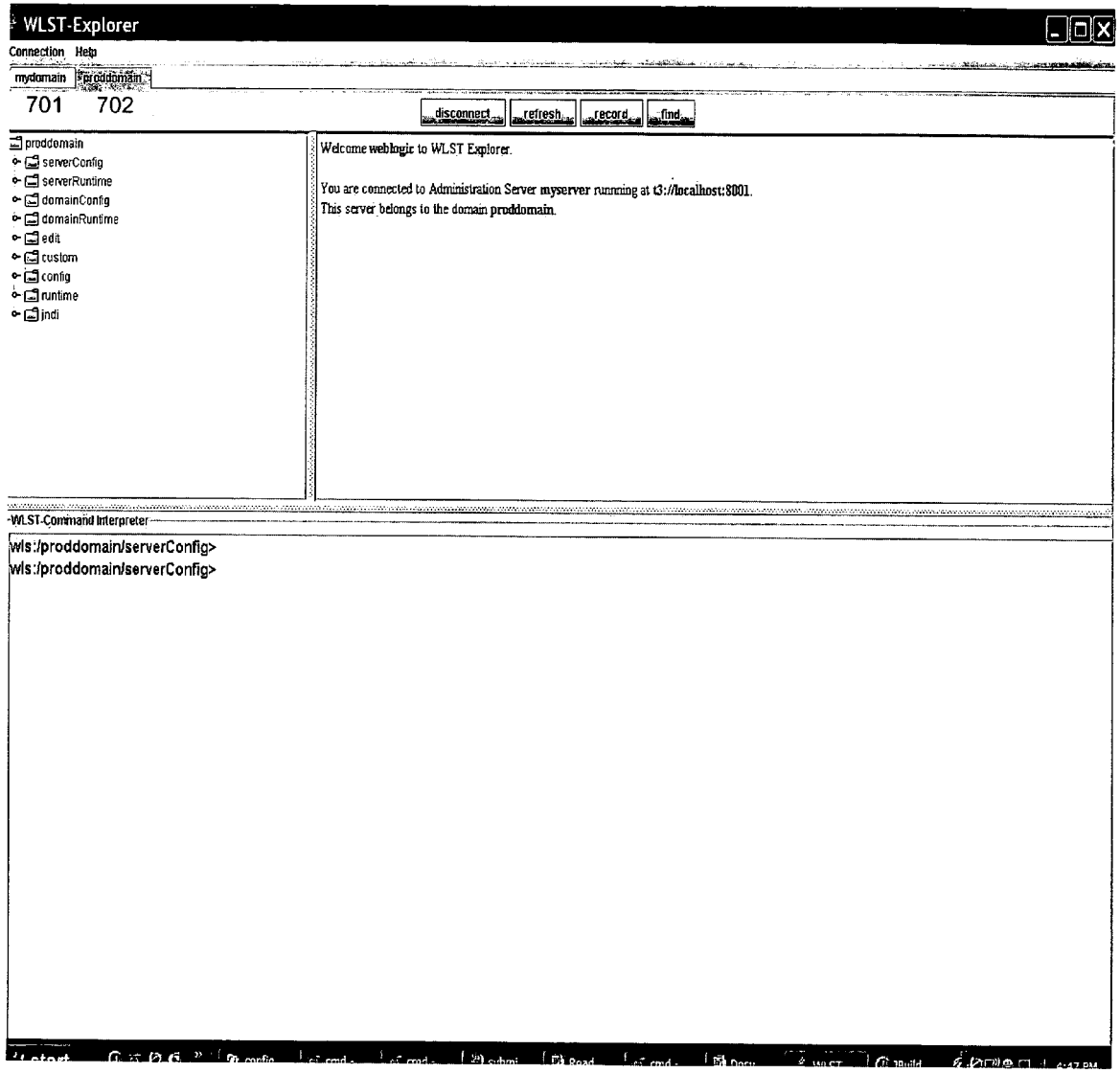
FIG. 7 is an exemplary illustration of managing multiple domains in accordance with one embodiment of the invention.

In some embodiments, the explorer allows a user to manage multiple domains at the same time by rendering each domain under management as a tab 701 and 702 in the GUI as shown in FIG. 7. Each of the domains can have one or more servers and the user needs to connect to each of them before navigation.

Figure 8:
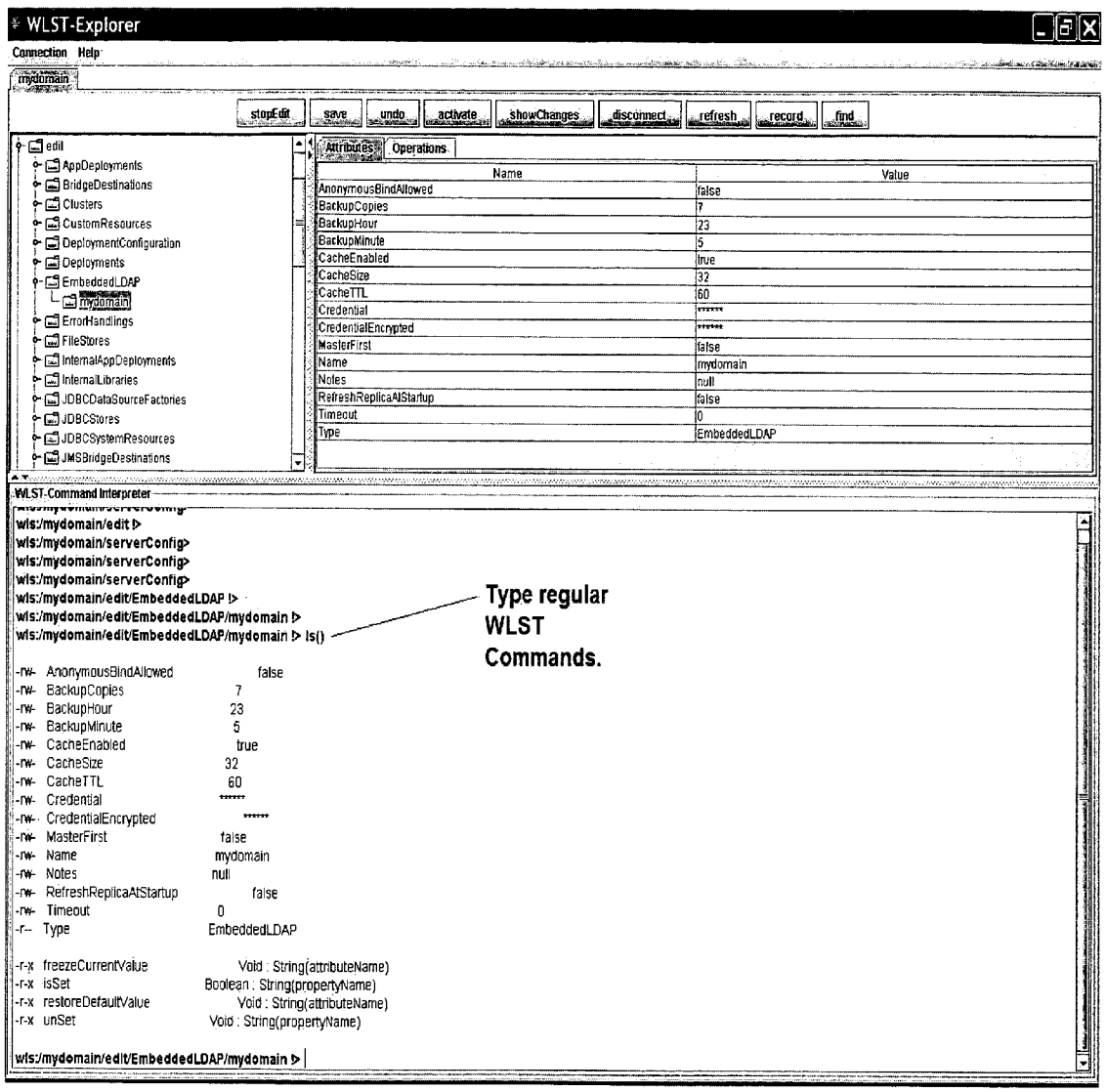
FIG. 8 is an exemplary illustration of using scripting instructions via the command line script interpreter in accordance with one embodiment of the invention.

In some embodiments, the command line script interpreter embedded in the GUI allows the user to type regular scripting instructions (commands) in this window as shown in FIG. 8 to interact with a server to perform administrative tasks. It interprets the scripting instructions either interactively, supplied one-at-a-time from a command prompt on a scripting interface, or in batches via a script file.

In some embodiments, a set of local variables and primitives (pre-defined commands/instructions) can be defined by the interpreter. All variables can be initialized to their default values at the start of a session and can be adjusted according to the user's interaction with the interpreter. A user can also extend or modify the primitives supported by the interpreter by following the Jython language syntax. Most of the primitives defined are convenience instructions, which are mostly executable functions that are extensions to Jython language readily available to the user of the interpreter at the start of a user session.

Figure 9:
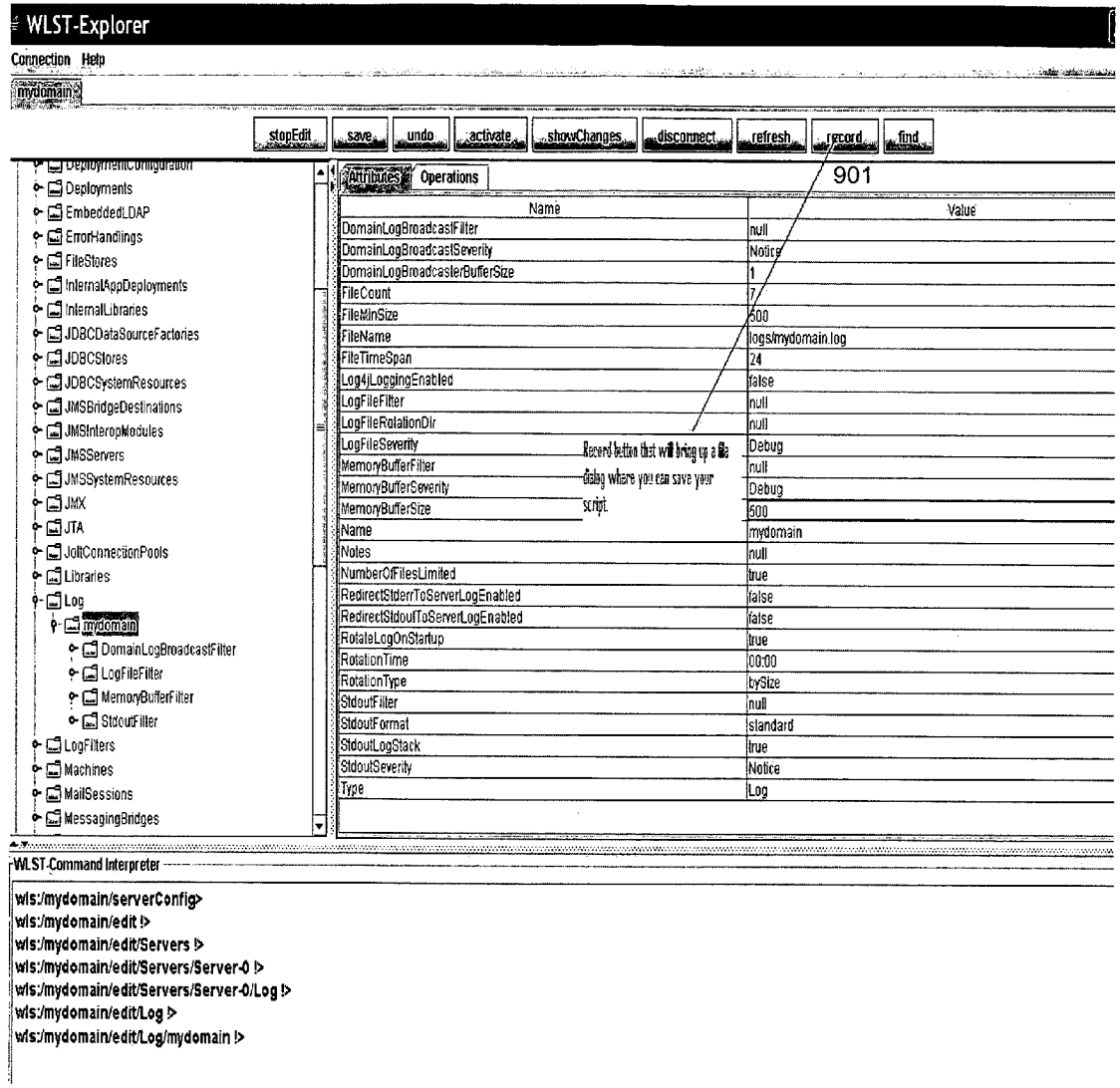
FIG. 9($a$)-($d$) is an exemplary illustration of generating and recording all actions taken by the user in the explorer into a script file in accordance with one embodiment of the invention.
Figure 9:
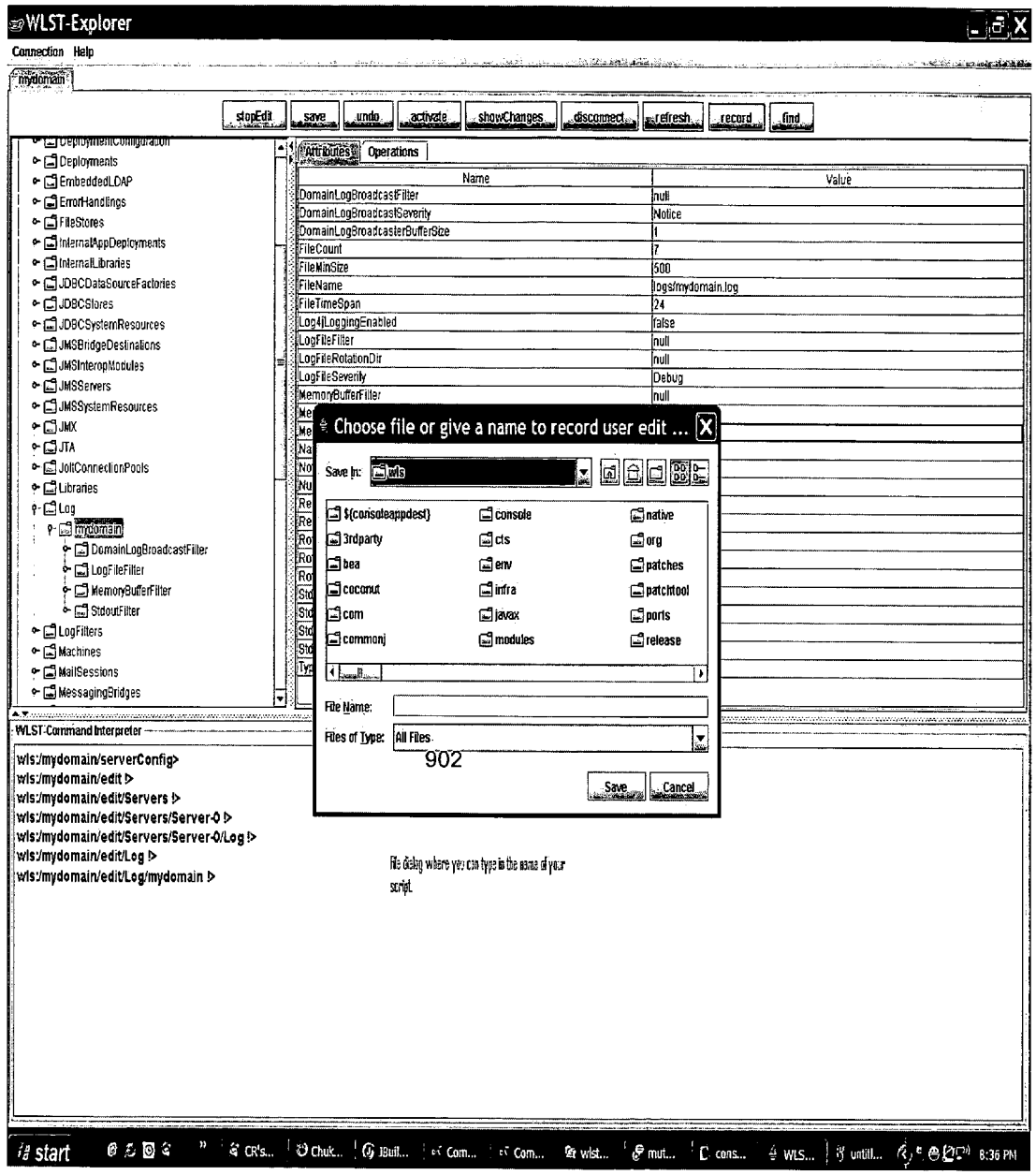
Figure 9:
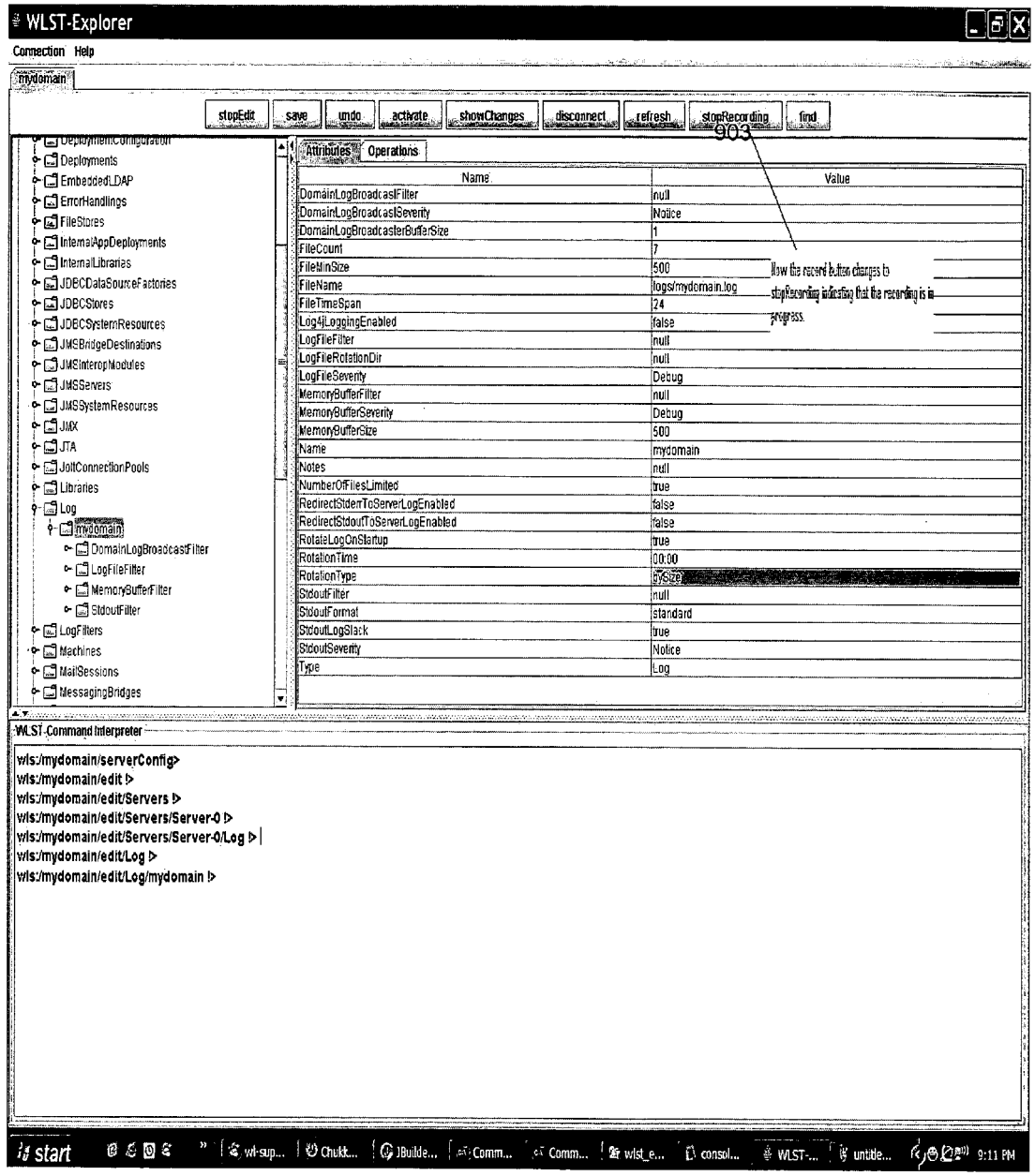
Figure 9:
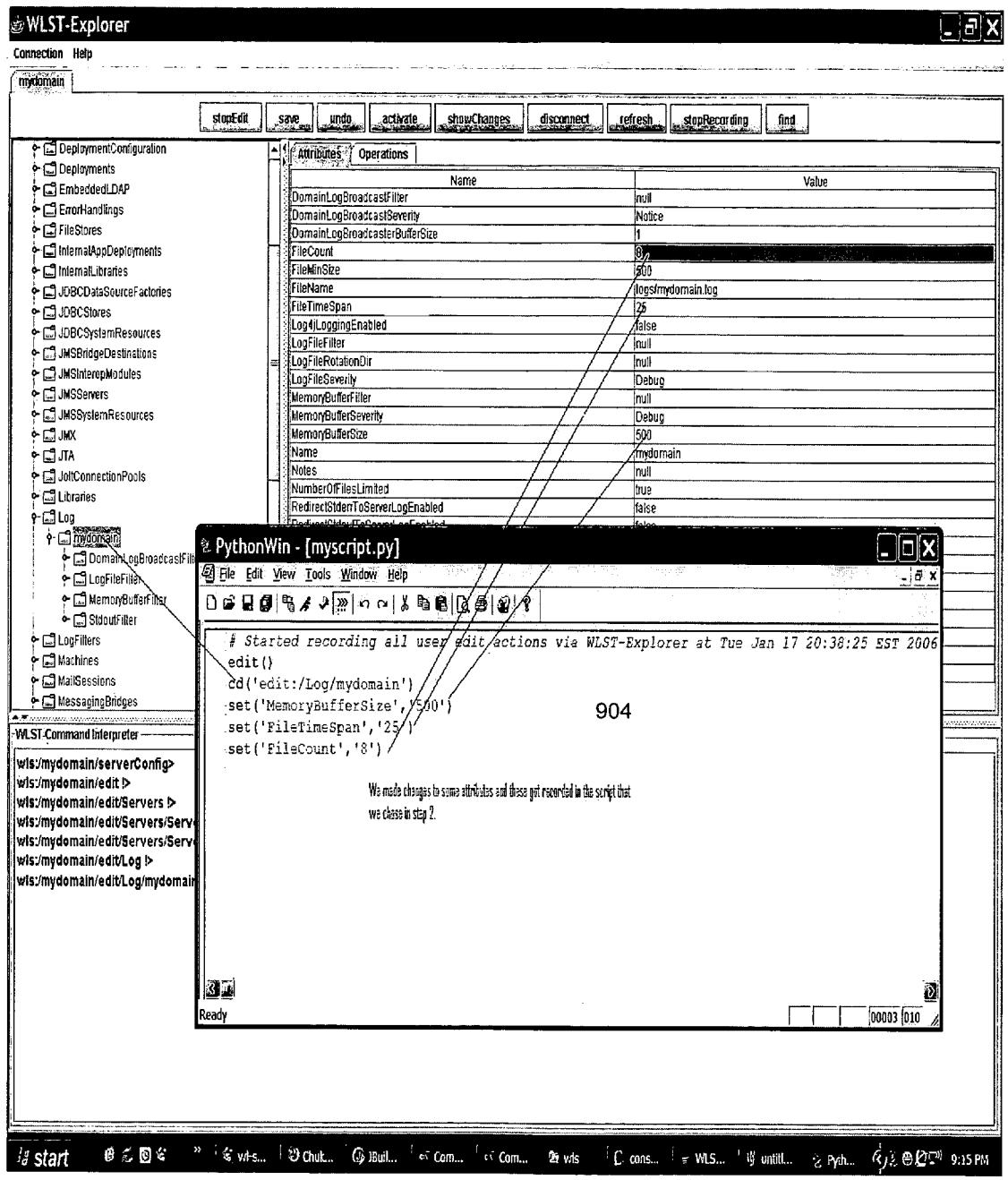

In some embodiments, the explorer allows a user to generate and/or record all the actions taken in the explorer via GUI and/or the script interpreter into a script file as shown in FIG. 9(a)-(d). The user can record his/her actions on the management objects in a script file by choosing the "record" button 901 (FIG. 9 (a)), which will bring up a file dialog 902 that allows the user to choose the name and the store location of the script file to be saved (FIG. 9(b)). The user can stop the script recording in progress at anytime by choosing the "stopRecording" button 903 (FIG. 9(c)), and all the script commands recorded so far, for non-limiting examples, changes to the attributes' values 904 as shown in FIG. 9(d), will be saved as a script file.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "instruction" is used in the embodiments of the systems and methods described above, it will be evident that such concept can be interchangeably used with equivalent concepts such as command, primitive, and other suitable concepts. While the concept "interface" is used in the embodiments of the systems and methods described above, it will be evident that such concept can be interchangeably used with equivalent concepts such as shell, window, browser, and other suitable concepts. While the concept "object" is used in the embodiments of the systems and methods described above, it will be evident that such concept can be interchangeably used with equivalent concepts such as instance, and other suitable concepts. While the concept "bean" is used in the embodiments of the systems and methods described above, it will be evident that such concept can be interchangeably used with equivalent concepts such as class, interface, object module, component, method, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a scripting framework for server configuration, comprising:
a plurality of management objects maintained on one or more servers, wherein each management object represents a manageable resource of a plurality of manageable resources that are associated with the one or more servers; and
a scripting explorer, running on one or more processors, operable to:
establish a connection to the one or more servers;
present a first set of management objects in the plurality of management objects in a configuration information traversable hierarchy on a graphical user interface (GUI) of the scripting explorer, wherein each management object in the configuration information traversable hierarchy manages configuration information associated with the one or more servers;
present a second set of management objects in the plurality of management objects in a runtime information traversable hierarchy on the GUI of the scripting explorer, wherein each management object in the runtime information traversable hierarchy manages runtime information associated with the one or more servers;
enable a user to perform one or more operations in a sequence on both the configuration information traversable hierarchy and the runtime information traversable hierarchy to configure the plurality of servers via the GUI, wherein the one or more operations performed by the user are not pre-defined; and
allow the user to start recording the one or more operations by the user into a script file in the sequence that can be reused later.

2. The system according to claim 1, wherein:
each said server can be one of a web server, an application server, a database server, and an administrative server.

3. The system according to claim 1, wherein:
the one or more servers can locate on one or more domains.

4. The system according to claim 1, wherein:
the connection by the scripting explorer to the one or more servers can be persistently maintained as a user session, wherein operations performed by the user in the user session are captured and operable to be referenced during the user session.

5. The system according to claim 1, wherein:
each traversable hierarchy is a tree.

6. The system according to claim 1, wherein:
an operation in the one or more operations can be one of browsing, creating, deleting, and updating the plurality of management objects.

7. The system according to claim 1, further comprising:
a command line scripting interpreter operable to:
accept one or more scripting instructions directly from the user; and interpret and execute the one or more scripting instructions against the one or more servers.

8. The system according to claim 7, wherein:
the one or more scripting instructions can be based on Jython syntax.

9. The system according to claim 7, wherein:
the command line scripting interpreter can be synchronized with the GUI.

10. The system according to claim 1, wherein:
the configuration information traversable hierarchy and the runtime information traversable hierarchy two separate traversable hierarchies, and wherein the scripting explorer is adapted to allow a user to navigate directly to a node in the configuration information traversable hierarchy from the runtime information traversable hierarchy, wherein the node in the configuration information traversable hierarchy is where the user last visited before the user moved to the runtime information traversable hierarchy.

11. The system according to claim 1, wherein:
the scripting explorer is further operable to:
  initiate a session for the user that have access to the connection;
  maintain the connection persistently in a persistent store throughout the session; and
  capture the one or more operations by the user in the session.

12. The system according to claim 1, wherein:
the scripting explorer is further operable to allow the user to stop recording the one or more operations by the user into the script file.

13. The system according to claim 1, wherein:
the scripting explorer includes a record button that can, upon choosing by the user, start recording the one or more operations by the user into the script file.

14. A method to provide a scripting framework for server configuration, comprising:
  maintaining a plurality of management objects on one or more servers, wherein each of the plurality of management objects represents a manageable resource of a plurality of manageable resources that are associated with the one or more servers;
  establishing a connection to the one or more servers via a scripting explorer;
  presenting a first set of management objects in the plurality of management objects in a configuration information traversable hierarchy on a graphical user interface (GUI) of the scripting explorer, wherein each management object in the configuration information traversable hierarchy manages configuration information associated with the one or more servers;
  presenting a second set of management objects in the plurality of management objects in a runtime information traversable hierarchy on the GUI of the scripting explorer, wherein each management object in the runtime information traversable hierarchy manages runtime information associated with the one or more servers;
  enabling a user to perform one or more operations in a sequence on both the configuration information traversable hierarchy and the runtime information traversable hierarchy to configure the plurality of servers via the GUI, wherein the one or more operations performed by the user are not pre-defined; and
  allowing the user to start recording the one or more operations by the user into a script file in the sequence that can be reused later.

15. The method according to claim 14, further comprising:
browsing, creating, deleting, or updating the plurality of management objects to configure the one or more servers.

16. The method according to claim 14, further comprising:
performing at least one of the following via a command line scripting interpreter:
  accepting one or more scripting instructions directly from the user; and
  interpreting and executing the one or more scripting instructions against the one or more servers.

17. The method according to claim 16, further comprising:
synchronizing the command line scripting interpreter with the GUI.

18. A machine readable medium having instructions stored thereon that when executed cause a system to:
  maintain a plurality of management objects on one or more servers, wherein each of the plurality of management objects represents a manageable resource of a plurality of manageable resources that are associated with the one or more servers;
  establish a connection to the one or more servers via a scripting explorer;
  present a first set of management objects in the plurality of management objects in a configuration information traversable hierarchy on a graphical user interface (GUI) of the scripting explorer, wherein each management object in the configuration information traversable hierarchy manages configuration information associated with the one or more servers;
  present a second set of management objects in the plurality of management objects in a runtime information traversable hierarchy on the GUI of the scripting explorer, wherein each management object in the runtime information traversable hierarchy manages runtime information associated with the one or more servers;
  enable a user to perform one or more operations in a sequence on both the configuration information traversable hierarchy and the runtime information traversable hierarchy to configure the plurality of servers via the GUI, wherein the one or more operations performed by the user are not pre-defined; and
  allow the user to start recording the one or more operations by the user into a script file in the sequence that can be reused later.

* * * * *

UNITED STATES PATENT AND TRADEMARK OFFICE
CERTIFICATE OF CORRECTION

PATENT NO.         : 8,078,971 B2                            Page 1 of 1
APPLICATION NO.    : 11/339103
DATED              : December 13, 2011
INVENTOR(S)        : Ghattu It is certified that error appears in the above-identified patent and that said Letters Patent is hereby corrected as shown below:

On Title page, in column 2, under "Abstract", line 1, delete "provides provide" and insert -- provides --, therefor.

In column 2, line 56, delete "FIG. 1." and insert -- FIG. 1, --, therefor.

Signed and Sealed this
Sixth Day of March, 2012

David J. Kappos
*Director of the United States Patent and Trademark Office*